US008799798B2

(12) United States Patent
Ito

(10) Patent No.: US 8,799,798 B2
(45) Date of Patent: Aug. 5, 2014

(54) METHOD AND SYSTEM FOR HANDWRITING-BASED LAUNCH OF AN APPLICATION

(75) Inventor: Hidenobu Ito, Kawasaki (JP)

(73) Assignee: Fujitsu Limited, Kawasaki-shi (JP)

( * ) Notice: Subject to any disclaimer, the term of this patent is extended or adjusted under 35 U.S.C. 154(b) by 421 days.

(21) Appl. No.: 12/796,814

(22) Filed: Jun. 9, 2010

(65) Prior Publication Data
US 2011/0307505 A1   Dec. 15, 2011

(51) Int. Cl.
*G06F 3/048* (2013.01)
*G06F 3/033* (2013.01)
*G06F 17/30* (2006.01)

(52) U.S. Cl.
CPC .... *G06F 17/30867* (2013.01); *G06F 17/30997* (2013.01); *G06F 17/30864* (2013.01); *G06F 17/3025* (2013.01); *G06F 17/30259* (2013.01); *G06F 17/3079* (2013.01)
USPC ........... 715/764; 715/863; 715/823; 715/824; 715/825

(58) Field of Classification Search
CPC .................. G06F 17/30867; G06F 17/30997; G06F 17/30864; G06F 17/3025; G06F 17/30259; G06F 17/3079
USPC .......................... 715/863, 823, 824, 825, 764
See application file for complete search history.

(56) References Cited

U.S. PATENT DOCUMENTS

| 6,182,069 | B1* | 1/2001 | Niblack et al. ................... 1/1 |
| 6,476,834 | B1* | 11/2002 | Doval et al. ................... 715/863 |
| 7,872,669 | B2* | 1/2011 | Darrell et al. ............... 348/207.1 |
| 8,108,408 | B2* | 1/2012 | Kondo et al. ................ 707/749 |
| 8,359,295 | B2* | 1/2013 | Norton et al. ................ 707/692 |
| 8,417,712 | B2* | 4/2013 | Narayanan et al. ........... 707/749 |
| 8,423,916 | B2* | 4/2013 | Chihara et al. ................ 715/863 |
| 2004/0240739 | A1* | 12/2004 | Chang et al. .................. 382/186 |
| 2009/0265334 | A1* | 10/2009 | Narayanan et al. ............... 707/5 |
| 2010/0077003 | A1* | 3/2010 | Kondo et al. ................ 707/780 |
| 2010/0306249 | A1* | 12/2010 | Hill et al. ..................... 707/769 |

* cited by examiner

Primary Examiner — David Phantana Angkool
(74) Attorney, Agent, or Firm — Baker Botts L.L.P.

(57) ABSTRACT

Methods and systems for providing navigation assistance on a mobile device are provided. A method may include analyzing handwriting data to recognize one or more objects depicted in the handwriting data. The method may further include determining if one or more applications are associated with the handwriting data based on the one or more objects recognized in the handwriting data. If one application is determined to be associated with the handwriting data, the one application may be launched. If two or more applications are determined to be associated with the handwriting data, information allowing a user to select an application to launch from the two or more applications may be displayed.

18 Claims, 4 Drawing Sheets

METHOD AND SYSTEM FOR HANDWRITING-BASED LAUNCH OF AN APPLICATION

TECHNICAL FIELD

This disclosure relates in general to smart devices and more particularly to a method and system for providing handwriting-based launch of an application on a smart device.

BACKGROUND

In recent years, the functional capabilities of smart devices (e.g., computers, cellular phones, smart phones, personal digital assistants, etc.) have increased significantly. For example, such smart devices are now able to execute hundreds of different types of applications. However, on smart devices with many applications installed, a user may find it difficult to find an icon or other launch method for an application (e.g., may have to scroll through many screen pages of icons or search through long menus).

SUMMARY OF THE DISCLOSURE

The present disclosure provides methods and systems for providing handwriting-based methods and systems for launching an application on a smart device.

Methods and systems for providing navigation assistance on a mobile device are provided. A method may include analyzing handwriting data to recognize one or more objects depicted in the handwriting data. The method may further include determining if one or more applications are associated with the handwriting data based on the one or more objects recognized in the handwriting data. If one application is determined to be associated with the handwriting data, the one application may be launched. If two or more applications are determined to be associated with the handwriting data, information allowing a user to select an application to launch from the two or more applications may be displayed.

Technical advantages of certain embodiments of the present disclosure include a mechanism whereby a user of a smart device may access and launch an application without having to search for an icon, menu item, or other launch method for the application.

Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
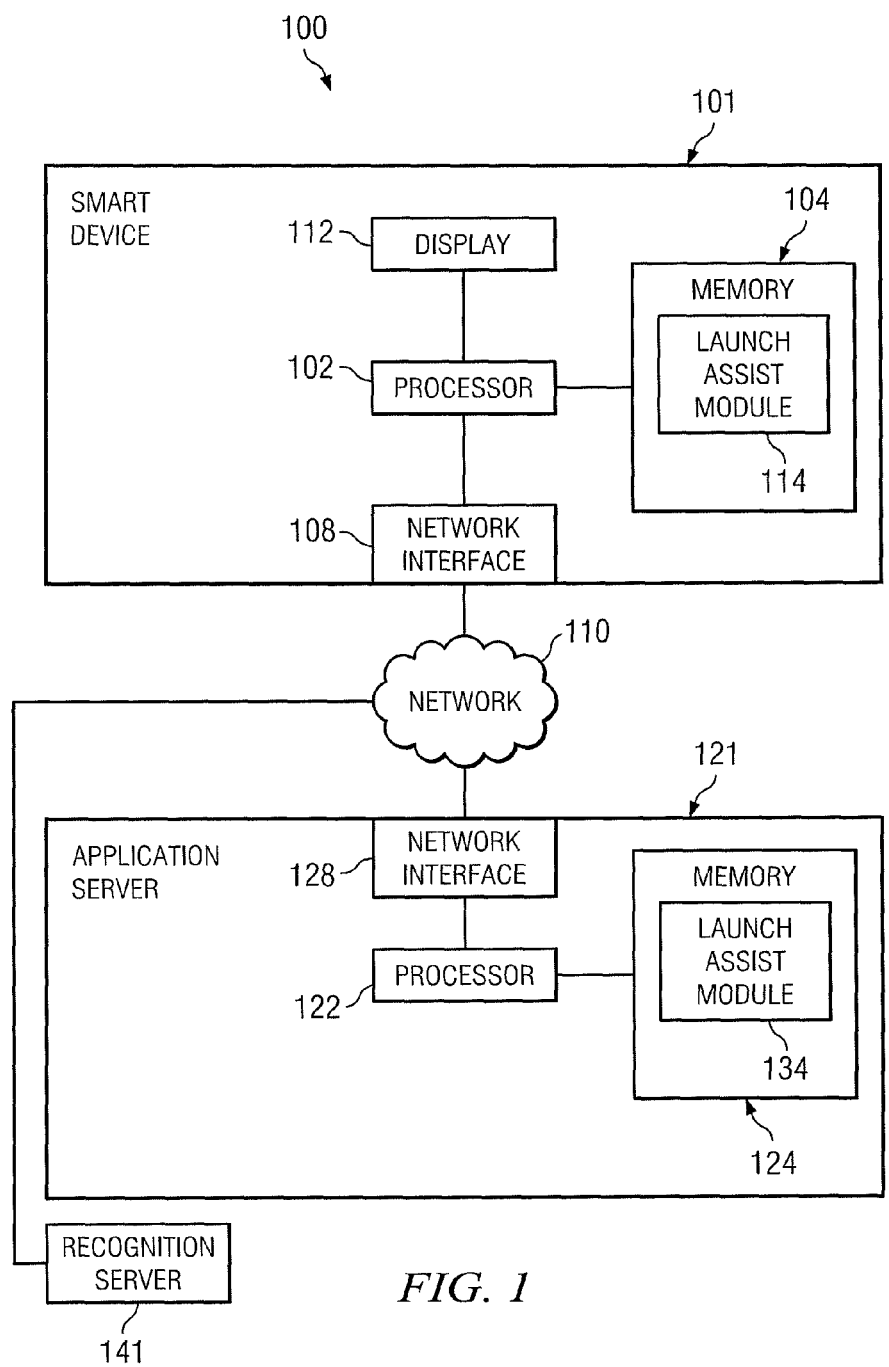
FIG. 1 illustrates a block diagram of an example system for providing handwriting-based launching of applications on a smart device, in accordance with certain embodiments of the present disclosure.
Figure 2A:
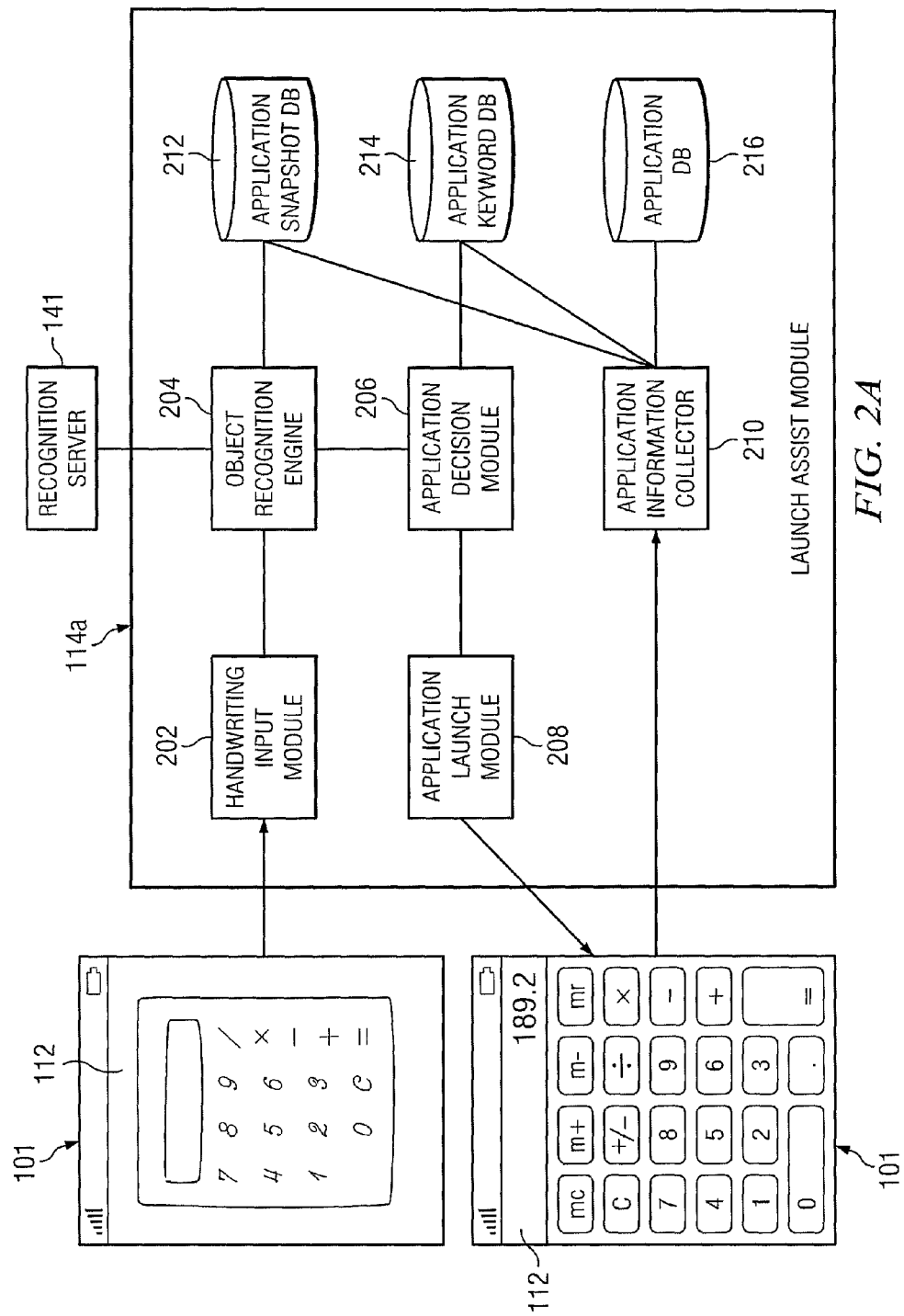
FIGS. 2A-2C illustrate selected components of various embodiments of launch assist modules, in accordance with certain embodiments of the present disclosure.
Figure 2B:
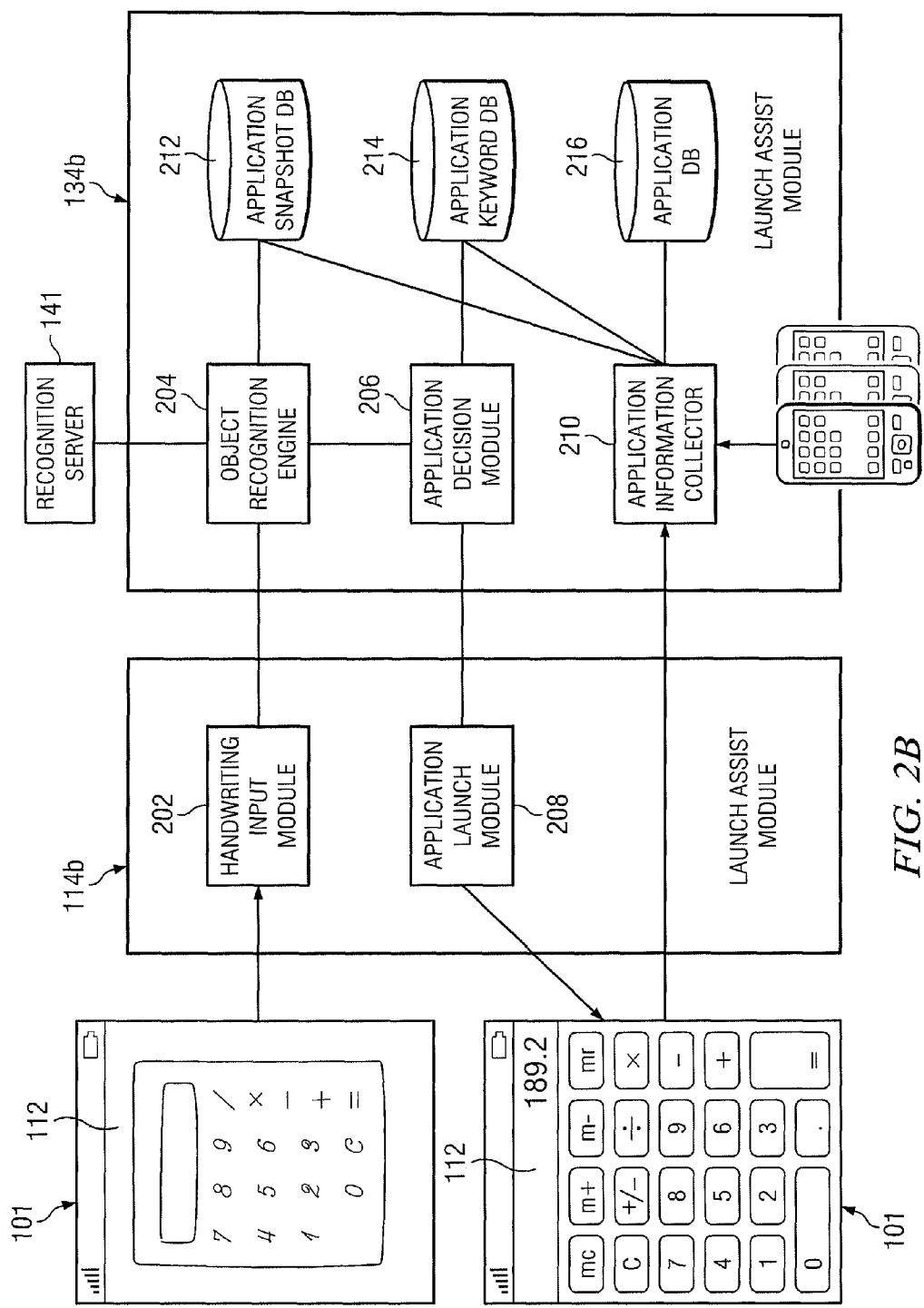
Figure 2C:
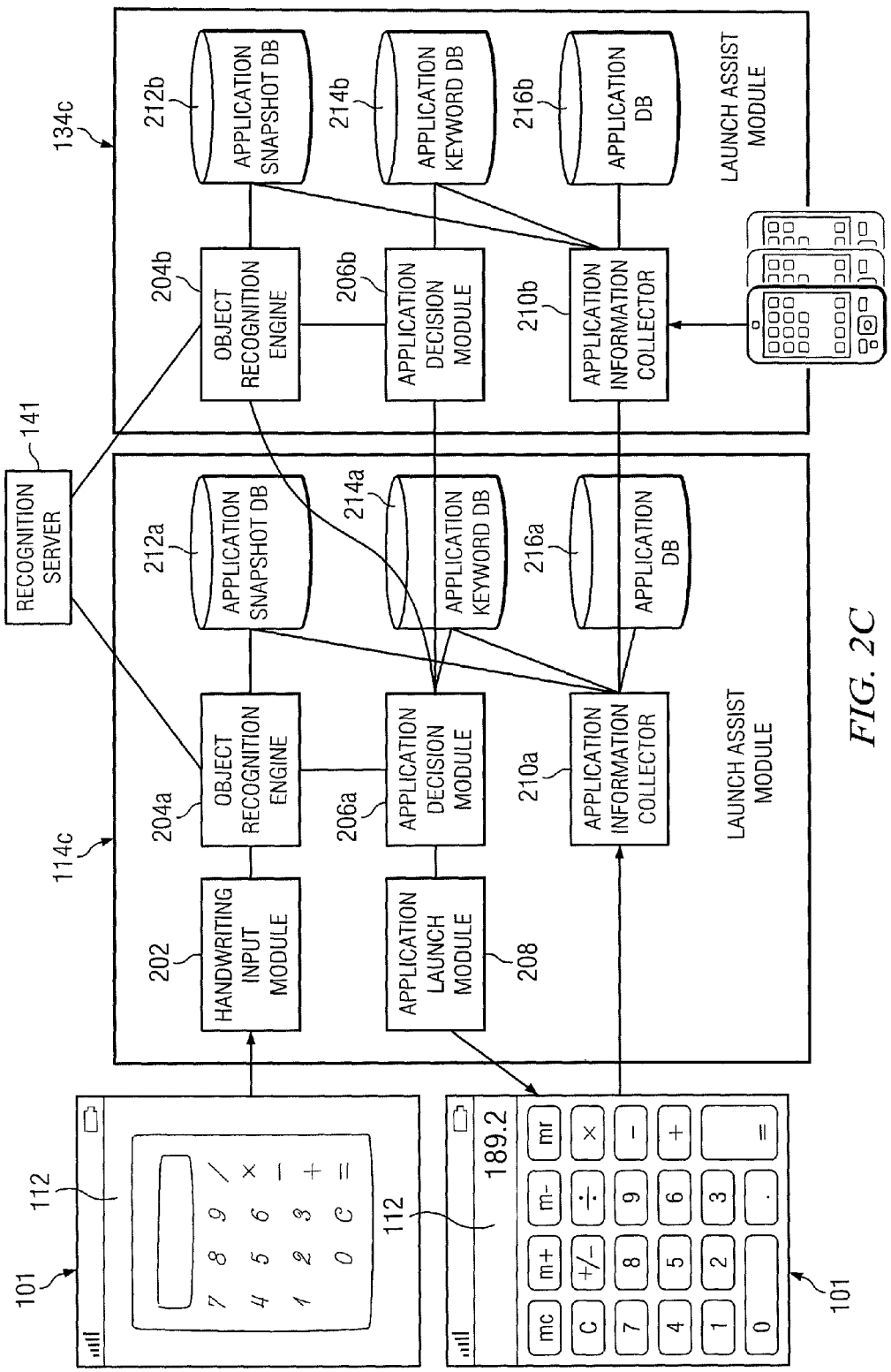

Embodiments and their advantages are best understood by reference to FIGS. 1-2C, wherein like numbers are used to indicate like and corresponding parts.

FIG. 1 illustrates a block diagram of an example system 100 for providing handwriting-based launching of applications on a smart device 101, in accordance with certain embodiments of the present disclosure. As depicted in FIG. 1, system 100 may include a smart device 101, a network 110, an application server 121, and a recognition server 141. Smart device 101 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, smart device 101 may be a personal computer (e.g., a laptop or notebook computer), a smart phone (e.g., a Blackberry or iPhone), a personal digital assistant, or any other suitable device and may vary in size, shape, performance, functionality, and price.

As shown in FIG. 1, smart device 101 may include a processor 102, a memory 104, a network interface 108, and a display 112.

Processor 102 may comprise any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 104 and/or another component of smart device 101. In the same or alternative embodiments, processor 102 may communicate data for display to a user on display 112.

Memory 104 may be communicatively coupled to processor 102 and may comprise any system, device, or apparatus configured to retain program instructions or data for a period of time (e.g., computer-readable media). Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to smart device 101 is turned off. As shown in FIG. 1, memory 104 may have stored thereon launch assist module 114. Generally speaking, launch assist module 114 may be a program of instructions configured to, when read from memory 104 and executed by processor 102, facilitate the launching of an application on smart device 101 based on handwriting input by a user of smart device 101. The structure and functionality of launch assist module 114 is discussed in greater detail with respect to FIGS. 2A-2C below.

Network interface 108 may include any suitable system, apparatus, or device operable to serve as an interface between smart device 101 and network 110. Network interface 108 may enable smart device 101 to communicate over network 110 using any suitable transmission protocol and/or standard, including without limitation all transmission protocols and/or standards enumerated below with respect to the discussion of network 110. Network interface 108 and its various components may be implemented using hardware, software, or any combination thereof.

Display 112 may be coupled to processor 102 and may include any system, apparatus, or device suitable for creating images (e.g., geometric shapes and/or alphanumeric characters) recognizable to a user. In addition, in some embodiments, display 112 may be configured to detect the presence and/or location of a tactile touch on or proximate to the display 112. Display 112 may include, for example, a liquid crystal display (LCD), a light-emitting diode (LED) display, or an organic LED display, and may employ any suitable mechanism for detecting the presence and/or location of a tactile touch, including, for example, resistive sensing, capacitive sensing, surface acoustic wave, projected capacitance, infrared, strain gauge, optical imaging, dispersive signal technology, or acoustic pulse recognition.

Network 110 may be a network and/or fabric configured to communicatively smart device 101 to application server 121, recognition server 141, and/or other devices. Network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), a cellular communications network, an intranet, the Internet or any other appropriate architecture or system that facilitates the communication of signals, data and/or messages (generally referred to as data). Network 110 may transmit data using any storage and/or communication protocol, including without limitation, Fibre Channel, Frame Relay, Ethernet Asynchronous Transfer Mode (ATM), Internet protocol (IP), Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), Integrated Digital Enhanced Network (iDEN), other packet-based protocol, and/or any combination thereof. Network 110 and its various components may be implemented using hardware, software, or any combination thereof.

Application server 121 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. Application server 121 may be a computer or any other suitable device and may vary in size, shape, performance, functionality, and price. As shown in FIG. 1, application server 121 may include a processor 122, a memory 124, and a network interface 128.

Processor 122 may comprise any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 122 may interpret and/or execute program instructions and/or process data stored in memory 124 and/or another component of application server 121.

Memory 124 may be communicatively coupled to processor 122 and may comprise any system, device, or apparatus configured to retain program instructions or data for a period of time (e.g., computer-readable media). Memory 124 may comprise random access memory (RAM), electrically erasable programmable read-only memory (EEPROM), a PCM-CIA card, flash memory, magnetic storage, opto-magnetic storage, or any suitable selection and/or array of volatile or non-volatile memory that retains data after power to server 121 is turned off. As shown in FIG. 1, memory 124 may have stored thereon launch assist module 134. Generally speaking, launch assist module 134 may be a program of instructions configured to, when read from memory 124 and executed by processor 122, facilitate the launching of an application on smart device 101 based on handwriting input by a user of smart device 101. The structure and functionality of launch assist module 134 is discussed in greater detail with respect to FIGS. 2A-2C below.

Network interface 128 may include any suitable system, apparatus, or device operable to serve as an interface between server 121 and network 110. Network interface 128 may enable server 121 to communicate over network 110 using any suitable transmission protocol and/or standard, including without limitation all transmission protocols and/or standards enumerated above with respect to the discussion of network 110. Network interface 108 and its various components may be implemented using hardware, software, or any combination thereof.

Recognition server 141 may include any instrumentality or aggregate of instrumentalities configured to recognize handwriting input to smart device 101, including without limitation text or sketches. For example, recognition server 141 may use optical carrier recognition known in the art or similar functionality to recognize alphanumeric text in handwriting input by a user of smart device 101. As another example, recognition server may analyze a sketch drawn by a user of smart device 101 and determine what was sketched by the user (e.g., a calculator, a camera, etc.).

FIGS. 2A-2C illustrate selected components of various embodiments of launch assist modules 114 and 134, in accordance with certain embodiments of the present disclosure. For example, FIG. 2A illustrates a single mode or client-only mode embodiment of launch assist module 114a, in which launch assist functionality is performed substantially entirely on smart device 101 (e.g., a launch assist module 134 is not used or is of limited functionality). FIG. 2B illustrates a hybrid or client and server mode embodiment of launch assist modules 114b and 134b, in which launch assist functionality is distributed between smart device 101 and application server 121. FIG. 2C illustrates an alternative hybrid or client and server mode embodiment of launch assist modules 114c and 134c, in which the approaches of FIGS. 2A and 2B are combined, such that launch assist functionality is distributed between smart device 101 and application server 121. As shown in FIGS. 2A-2C, launch assist modules 114 and 134, either alone or in combination with one another, may be configured to accept handwriting data (e.g., text and/or sketches) from display 112 of smart device 101 and, based at least on such handwriting data, launch an application. As shown in FIGS. 2A-2C, launch assist modules 114 and 134 may comprise, individually or in the aggregate, a handwriting input module 202, an object recognition engine 204 (including object recognition engines 204a and 204b depicted in FIG. 2C), an application decision module 206 (including application decision modules 206a and 206b depicted in FIG. 2C), an application launch module 208, an application information collector 210 (including application information collectors 210a and 210b depicted in FIG. 2C), application snapshot database 212 (including application snapshot databases 212a and 212b depicted in FIG. 2C), application keyword database 212 (including application keyword databases 214a and 214b depicted in FIG. 2C), and application database 216 (including application databases 216a and 216b depicted in FIG. 2C).

Handwriting input module 202 may be a program of instructions which may be configured to, when executed by processor 102, receive handwriting data from display 112 of smart device 101. Such handwriting data may be input by a user of smart device 101 (e.g., by the user's movement of a finger, stylus, or other appropriate pointing device on the surface of display 112) and may include text, a sketch of an object, and/or any other suitable markings. For illustrative purposes only, FIGS. 2A-2C depict a sketch of a calculator as the handwriting data, although other handwriting data (e.g., text including the words "calc" or "calculator," other text, or other sketches) may be input by a user and received by handwriting input module 202.

An object recognition engine 204 may be a program of instructions which may be configured to, when executed by processor 102 or processor 122, receive handwriting data captured by handwriting input module 202 and analyze such data to determine the object or objects (text, pictures, etc.) depicted in the handwriting data. As shown in FIG. 2, object recognition engine 204 may communicate with recognition server 141 and/or application snapshot database 212 in making such analysis and determination. For example, recognition server 141 may assist object recognition engine 204 in analyzing the handwriting data and/or determining an object or objects present in the handwriting data. Alternatively or in addition thereto, object recognition engine 204 may compare the handwriting data to images present in application snapshot database 212 in order to determine if such images are similar to an image represented by the handwriting data.

An application decision module 206 may be a program of instructions which may be configured to, when executed by processor 102 or processor 122, determine one or more applications associated with the handwriting data based on the object(s) recognized in the handwriting data. As shown in FIG. 2, application decision module 206 may communicate with application keyword database 214 in making such decision. For example, if the object recognized by object recognition engine 204 is a sketch of a calculator, application decision module 206 may determine which applications have the keyword "calc" or "calculator" associated with them and select such applications as being associated with the handwriting data.

In the hybrid approach shown in FIG. 2C, application decision module 206a may also communicate with object recognition engine 204b and application decision module 206b in the event that application decision module 206a is unable to determine any applications associated with the handwriting data based the information present within smart device 101 (e.g., application keyword database 214a). In such an event, application decision module 206a may communicate the handwriting data to object recognition module 204b. Object recognition module 204b may determine the object or objects (text, pictures, etc.) depicted in the handwriting data, as described above. Application decision module 206b may then, based on the object(s) determined by object recognition module 204b, determine one or more applications associated with the handwriting data and communicate such determination to application decision module 206a.

Application launch module 208 may be a program of instructions which may be configured to, when executed by processor 102, either: (a) if only one application is determined by application decision module 206 to be associated with the handwriting data, launch such application or (b) if two or more applications are determined by application decision module to be associated with the handwriting data, display to display 112 information (e.g., icons for each of such applications) allowing a user to select an application to launch from such two or more applications.

Application information collector 210 may be a program of instructions which may be configured to, when executed by processor 102 or processor 122, collect information about applications executed on smart device 101 (as shown in FIGS. 2A and 2B), executed on other smart devices (as shown in FIGS. 2B and 2C), and/or listed in application database 216 (as shown in FIGS. 2A-2C), and communicate such information to an application snapshot database 212 and/or an application keyword database 214. Such collection and communication of information may improve the information available in application snapshot databases 212 and/or application keyword databases 214, such that the ability of object recognition engine 204 to recognize images and/or the ability of application decision module 206 to make decisions regarding which applications are associated with handwriting data may improve over time.

An application snapshot database 212 may be a database, table, list, map, or any other suitable data structure that includes one or more images related to applications that may execute on a smart device 101 (e.g., icons used to launch such applications, screen captures of the execution of such applications, etc.).

An application keyword database 214 may be a database, table, list, map, or any other suitable data structure that includes one or more keywords related to applications that may execute on a smart device 101. An application keyword database 214 may also maintain associations between keywords and the applications to which the keywords are related (e.g., a calculator application may be associated with the words "calc," "calculator," "math," "mathematics," etc.).

An application database 216 may be a database, table, list, map, or any other suitable data structure that includes information regarding applications that may execute on a smart device 101.

A component of system 100 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Versatile Disk (DVD)), database and/or network storage (for example, a server), and/or other computer-readable medium.

Modifications, additions, or omissions may be made to system 100 without departing from the scope of the invention. The components of system 100 may be integrated or separated. Moreover, the operations of system 100 may be performed by more, fewer, or other components. Additionally, operations of system 100 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method, comprising:

analyzing handwriting data to recognize one or more objects depicted in the handwriting data, the handwriting data including a sketch of the one or more objects, analyzing the handwriting data comprising comparing the sketch of the one or more objects to images present in a database to determine if one or more of the images are similar to the sketch;

determining if one or more applications of a plurality of applications are associated with the handwriting data based on the one or more objects recognized in the handwriting data, determining if one or more applications are associated with the handwriting data comprising:

associating one or more keywords with each of the plurality of applications without associating any image with an application;

determining one or more keywords associated with the one or more images that are determined to be similar to the sketch; and after determining the one or more keywords associated with the one or more images, determining if any applications are associated with the one or more keywords; and if one application is determined to be associated with the handwriting data, launching the one application.

2. The method according to claim 1, further comprising displaying information allowing a user to select an application to launch from the two or more applications if two or more applications are determined to be associated with the handwriting data.

3. The method according to claim 1, wherein the handwriting data includes text.

4. The method according to claim 1, further comprising:
collecting information about applications launched; and
communicating the collected information to an application keyword database.

5. The method according to claim 1, wherein the one or more keywords are maintained in an application keyword database.

6. The method according to claim 5, further comprising:
collecting information about applications launched; and
communicating the collected information to the application keyword database.

7. A device, comprising:
a processor;
a display communicatively coupled to the processor and configured to display images recognizable to a user; and
a launch assist module communicatively coupled to the processor and configured to:
analyze handwriting data to recognize one or more objects depicted in the handwriting data, the handwriting data including a sketch of the one or more objects, analyzing the handwriting data comprising comparing the sketch of the one or more objects to images present in a database to determine if one or more of the images are similar to the sketch;
determine if one or more applications of a plurality of applications are associated with the handwriting data based on the one or more objects recognized in the handwriting data, determining if one or more applications are associated with the handwriting data comprising:
associating one or more keywords with each of the plurality of applications without associating any image with an application;
determining one or more keywords associated with the one or more images that are determined to be similar to the sketch; and
after determining the one or more keywords associated with the one or more images, determining if any applications are associated with the one or more keywords; and
if one application is determined to be associated with the handwriting data, launch the one application for execution on the device.

8. The device according to claim 7, the launch assist module further configured to display information allowing the user to select an application to launch from the two or more applications if two or more applications are determined to be associated with the handwriting data.

9. The device according to claim 7, wherein the handwriting data includes text.

10. The device according to claim 7, the launch assist module further configured to:
collect information about applications launched; and
communicate the collected information to the application keyword database.

11. The device according to claim 7, wherein the one or more keywords are maintained in an application keyword database.

12. The device according to claim 11, further comprising the launch assist module configured to:
collect information about applications launched; and
communicate the collected information to the application keyword database.

13. A device, comprising:
a processor;
a display communicatively coupled to the processor and configured to display images recognizable to a user;
a first launch assist module communicatively coupled to the processor; and
a network interface communicatively coupled to the processor and configured to couple a server to the device, the server having a second launch assist module;
the first input assist module and second input assist module configured to, in the aggregate:
analyze handwriting data to recognize one or more objects depicted in the handwriting data, the handwriting data including a sketch of the one or more objects, analyzing the handwriting data comprising comparing the sketch of the one or more objects to images present in a database to determine if one or more of the images are similar to the sketch;
determine if one or more applications of a plurality of applications are associated with the handwriting data based on the one or more objects recognized in the handwriting data, determining if one or more applications are associated with the handwriting data comprising:
associating one or more keywords with each of the plurality of applications without associating any image with an application;
determining one or more keywords associated with the one or more images that are determined to be similar to the sketch; and
after determining the one or more keywords associated with the one or more images, determining if any applications are associated with the one or more keywords; and
if one application is determined to be associated with the handwriting data, launch the one application for execution on the device.

14. The device according to claim 13, the first input assist module and the second input assist module configured to, in the aggregate display information allowing the user to select an application to launch from the two or more applications if two or more applications are determined to be associated with the handwriting data.

15. The device according to claim 13, wherein the handwriting data includes text.

16. The device according to claim 13, the first launch assist module and the second launch assist module further configured to, in the aggregate:
   collect information about applications launched; and
   communicate the collected information to the application keyword database.

17. The device according to claim 13, wherein the one or more keywords are maintained in an application keyword database.

18. The device according to claim 17, further comprising the first launch assist module and the second launch assist module configured to, in the aggregate:
   collect information about applications launched; and
   communicate the collected information to the application keyword database.

\* \* \* \* \*